W. R. LOGAN.
CHICKEN FEEDER AND EXERCISER.
APPLICATION FILED MAY 19, 1909.

1,019,975.

Patented Mar. 12, 1912.

Witnesses
C. C. Holly
M. Beulah Townsend

Inventor
William Richard Logan
by James R. Townsend
his atty.

UNITED STATES PATENT OFFICE.

WILLIAM RICHARD LOGAN, OF LOS ANGELES, CALIFORNIA, ASSIGNOR OF ONE-HALF TO ROBERT HENRY ROSS, OF LOS ANGELES, CALIFORNIA.

CHICKEN FEEDER AND EXERCISER.

1,019,975.   Specification of Letters Patent.   Patented Mar. 12, 1912.

Application filed May 19, 1909. Serial No. 497,122.

*To all whom it may concern:*

Be it known that I, WILLIAM RICHARD LOGAN, a citizen of the United States, residing at Los Angeles, in the county of Los Angeles and State of California, have invented a new and useful Chicken Feeder and Exerciser, of which the following is a specification.

This invention relates to means for keeping confined fowls in good condition.

It is well known that laying hens should take sufficient exercise to keep them from becoming too fat; otherwise, the laying qualities of the hens and the fertility of their eggs deteriorate.

The object of this invention is to provide an apparatus that may be placed in a chicken yard or house, and which can be operated by the fowls to intermittently supply food to the fowls; the intermittent operation of the apparatus being effected by the fowls springing to and from a perch.

A further object of the invention is to so construct and arrange the parts of the apparatus that when the fowl operates the feeding device, the food discharged will be in front of and in convenient position for the fowl to quickly reach when jumping from its perch.

The accompanying drawings illustrate the invention in the best form I at present contemplate embodying the same.

Figure 1:
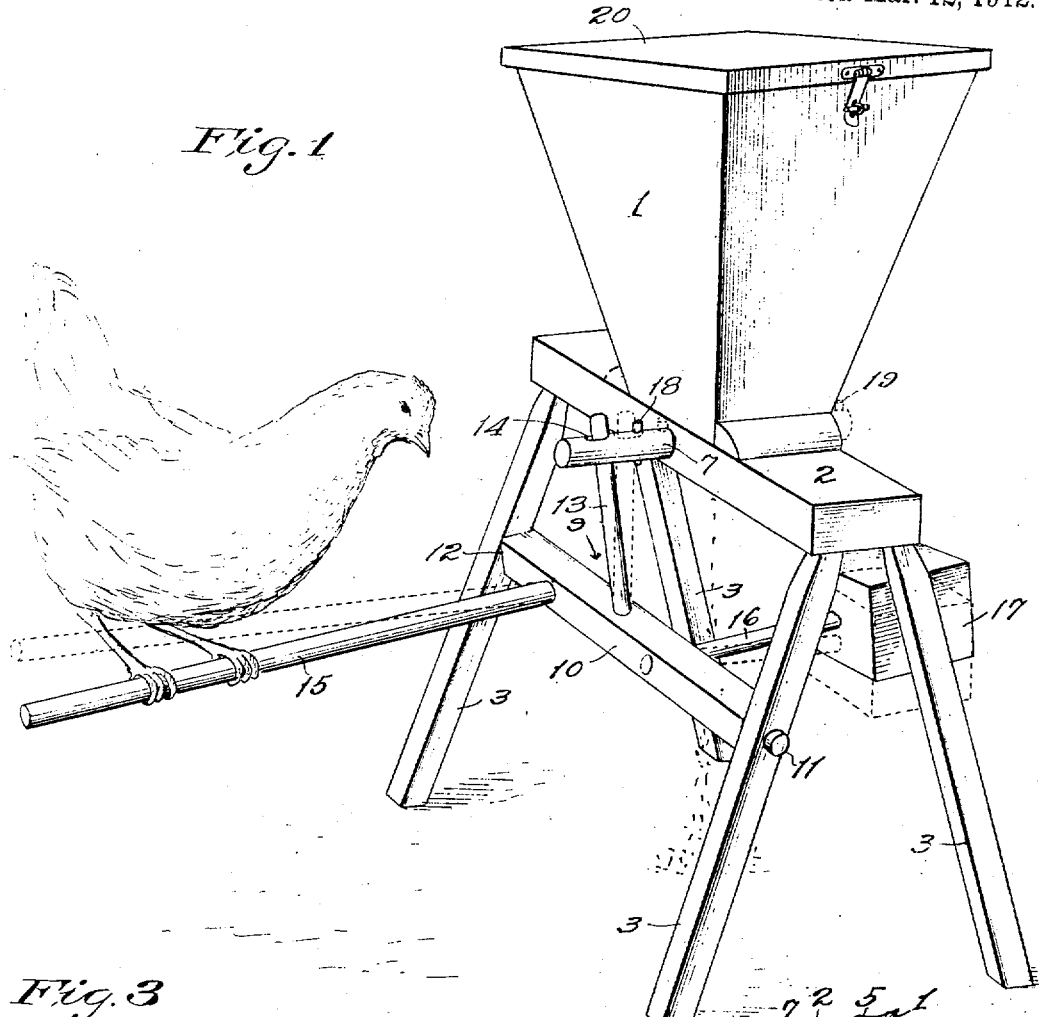
Figure 3:
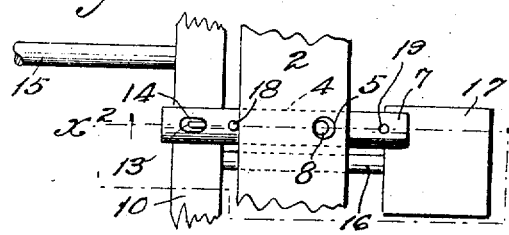
Figure 2:
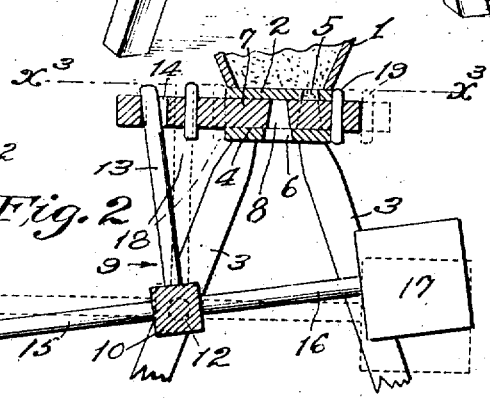
Figure 4:
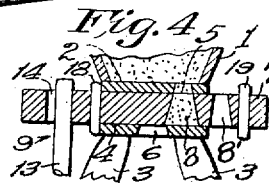

Figure 1 is a perspective view of the apparatus as it appears in use. Fig. 2 is fragmental detail in section along the axis of the valve. Line $x^2$, Fig. 1, indicates the line of section. Fig. 3 is a plan of the valve from line $x^3$, Fig. 2. Fig. 4 illustrates the valve of the invention as applied for double action.

The apparatus comprises a feed receptacle in the form of a hopper 1, the bottom or base of which may be formed of a cross-bar 2 supported by legs 3 and forming the frame of the apparatus. The bottom or base 2 of the hopper is provided with a valve-way 4 into the top of which a downwardly expanded outlet-port 5 opens from the hopper and from the bottom of which valve-way a downwardly expanded discharge-port 6 in staggered relation with the outlet-port is arranged to discharge from the valve-way.

The valve 7 may be provided with a downwardly expanded chamber 8 extending across the valve from top to bottom and arranged to register with the outlet-port 5 at one position of the valve and with the discharge-port 6 at another position of the valve. Said valve is operable by a bell-crank lever 9, the fulcrum member 10 of which may be a shaft journaled at 11, 12 in two of the legs 3 of the frame, which legs serve as means to hold the fulcrum member or shaft elevated.

One arm 13 of the bell-crank lever is operatively connected with the valve in some suitable way, as by a vertical mortise 14 through the valve outside of the base 2, through which mortise the upright arm 13 of the bell-crank extends. The other arm 15 of the bell-crank is practically horizontal and extends away from the frame at a distance from the ground so that it offers the fowl a suitable perch onto which it may hop from the ground. On the opposite side of the bell-crank fulcrum there extends an arm 16 having thereon a weight 17 of sufficient gravity to normally hold the fulcrum member in one position to hold the valve in position with its valve-chamber in register with the outlet-port when no fowl is on the perch, so that feed contained in the hopper may fall through the outlet-port and fill the chamber.

Stops 18 and 19 are arranged on the valve, the one to stop the valve with the chamber in register with the outlet-port when the perch is unoccupied and the valve is shifted by the weighted lever, and the other stop 19 being arranged to hold the valve with the chamber 8 in register with the discharge-port when the perch is depressed by the weight of a fowl thereon, or by any other means. It is thus seen that whenever the parts are free the valve is held by means of gravity in position to charge the valve-chamber, and whenever the perch-arm 14 of the bell-crank is depressed,—thus lifting the weight,—the chamber previously charged with feed from the hopper will be brought into register with the discharge-port so that the feed will fall by gravity to the ground.

The valve may be provided with either one or two chambers, as 8 and 8' in Fig. 4. The chamber 8' may be arranged to register with the outlet-port when the perch is depressed so that when the weighted arm returns the valve to normal position with its chamber 8 in register with the outlet-port, the chamber 8' will be stopped outside of the base, so that the feed carried by the chamber 8' will be discharged when the weighted lever is depressed and the perch is elevated.

The valve-shifting weight 17 is of such gravity only as may be necessary to normally return the valve to position with the chamber 8 in register with the outlet-port; and in order that the weight may be as light as possible and yet will invariably return the valve the mortise or seat for the upright arm of the bell-crank lever is larger than such arm where it passes through the seat therefor, thus to afford some lost motion, so that when the fowl jumps onto the perch the upright arm will be made to operate upon the valve by a quick blow, thus to start the valve and when the fowl jumps from the perch the weight will operate the arm to strike a blow on the valve to start it toward its normal closed position.

In practice, it is usually only necessary to train one fowl in an inclosure, to operate the apparatus. Such training may be accomplished by placing apparently in reach from the perch, decoy-food,—not shown,— that will be attractive to the fowl, thus causing the fowl to jump onto the perch to get the decoy-food. This will cause the perch to descend under the fowl's weight, and thereby will operate the valve to discharge through the discharge-port the charge of feed contained in the chamber 8. The fowl, espying the feed thus deposited on the ground, and being unable to reach the decoy-food that appeared to have been in reach from the perch before it was depressed, will hop to the ground and pick up the feed thus deposited. When this feed has been eaten, the fowl again turns her attention to the decoy-food, not shown, and will again hop upon the perch to get such food, when the operation just described will be repeated.

At the third trial by the fowl, as a general case, the decoy-food may be removed with the assurance that the fowl will repeat the operation for the sole purpose of getting at the feed which will be discharged by the valve.

It is to be noted that this chicken exerciser and feeder is a unitary device, the lever provided with a perch being fulcrumed to the receptacle through the medium of the frame that supports the receptacle, so that the apparatus may be moved from place to place and from inclosure to inclosure as required in giving proper attention and change of location to the fowls.

The apparatus is desirably constructed with but one chamber in the valve, so that feed is discharged only when the perch is depressed.

The operation in cases where two chambers are provided for the valve is apparent. That is to say, when the fowl reaches the perch the discharge from the first chamber 8 occurs as before described, and at the same time a charge of feed will enter the second chamber so that when the fowl hops from the perch to get the feed thus discharged, an additional charge of feed will be delivered to the ground. This arrangement may be employed where a number of small chickens are to be fed, as the feed discharged from one chamber might be all picked up before the fowl that operates the perch could reach the feed discharged from the first opening. Ordinarily, however, only one chamber will be provided in the valve, and it is possible to close the second chamber 8' by a stopper not shown, whenever it is required to change the double-chambered valve to a single-chambered valve. In any instance it is advisable to flare the ports and the chamber downwardly as clearly shown in Fig. 2, so that the food will always be discharged without sticking. The top of the hopper may be provided with a cover as shown at 20.

In actual practice, when one fowl in the yard has learned to operate the apparatus, the other fowls follow the example thus set, and each fowl may thus operate the apparatus and get its own feed, and the fowls are thus given requisite exercise.

It is understood that the yard will be provided with such a number of apparatuses as may be advisable to accomplish the required feeding, and that the form and proportions may be varied within the judgment of the constructor; and also that means other than the weighted lever for returning the valve may be employed without departing from the spirit of the invention.

I claim:—

1. A chicken feeder comprising a receptacle having an outlet in its bottom, a valve to open and close the outlet to intermittently discharge feed from the receptacle, a fulcrum member below the level of the valve, means to hold the fulcrum member elevated, an arm extending from the fulcrum member to operate the valve, means to normally hold the fulcrum member in one position, and a perch fixed to and projecting away from the fulcrum member and the receptacle to operate the fulcrum member and the arm and being horizontal when the valve is closed.

2. A receptacle, legs on the base of the receptacle, a fulcrum member mounted on the legs, a valve to intermittently discharge feed from the receptacle, an arm extending from the fulcrum to operate the valve, means to normally hold the fulcrum member in one position, and a perch projecting from the fulcrum member to operate the arm, so that when the perch is occupied the valve will be held in one position, and when it is unoccupied the valve will be moved into another position for the purpose of discharging feed from the receptacle.

3. The combination with a receptacle, of a base provided with a valve-way, an outlet-port being provided between the receptacle and the valve-way and a discharge-port being provided from the valve way, said outlet-port and discharge-port being in staggered relation with each other, a valve in said valve-way provided with a chamber, to register alternately with the outlet-port and the discharge-port to carry feed from the outlet-port to the discharge-port, said valve being also provided with a mortise, a bell-crank lever, one of the arms of which is arranged in and is smaller than the mortise, and the other arm of which extends to form a perch; means to operate the bell-crank lever to normally hold the perch elevated and the valve in such position that the chamber registers with the outlet-port, the perch being adapted to be depressed to shift the valve to bring the chamber into register with the discharge-port, the arm in said mortise being smaller than the mortise to allow lost motion for the purpose of hammering the valve to start it in either direction.

In testimony whereof, I have hereunto set my hand at Los Angeles, California, this 11th day of May, 1909.

WM. RICHARD LOGAN.

In presence of—
JAMES R. TOWNSEND,
M. BEULAH TOWNSEND.